(12) United States Patent
Flood

(10) Patent No.: US 7,170,032 B2
(45) Date of Patent: Jan. 30, 2007

(54) PROCESS FOR WELDING

(75) Inventor: Dale A. Flood, El Dorado Hills, CA (US)

(73) Assignee: TRI Tool Inc., Rancho Cordova, CA (US)

( * ) Notice: Subject to any disclaimer, the term of this patent is extended or adjusted under 35 U.S.C. 154(b) by 0 days.

(21) Appl. No.: 10/716,505

(22) Filed: Nov. 20, 2003

(65) Prior Publication Data

US 2005/0109735 A1    May 26, 2005

(51) Int. Cl.
*B23K 9/167* (2006.01)
(52) U.S. Cl. .................. 219/137 R; 219/61; 219/75
(58) Field of Classification Search ............ 219/137 R, 219/61, 74, 75, 125.11
See application file for complete search history.

(56) References Cited

U.S. PATENT DOCUMENTS

| | | | |
|---|---|---|---|
| 2,905,805 A | 9/1959 | McElrath et al. | |
| 4,300,034 A | 11/1981 | Schneider et al. | |
| 5,081,334 A | 1/1992 | Copher et al. | |
| 5,196,664 A | 3/1993 | McGushion | |
| 5,227,609 A | 7/1993 | Simon et al. | |
| 5,313,039 A | 5/1994 | Harvey et al. | |
| 5,550,348 A | 8/1996 | Masaie et al. | |
| 5,686,002 A * | 11/1997 | Flood et al. | 219/137 R |
| 6,140,607 A | 10/2000 | Kamada et al. | |
| 6,414,269 B2 | 7/2002 | Kim | |

OTHER PUBLICATIONS

Lyman, Taylor, editor, "Metals Handbook, 8th Edition, vol. 6, Welding and Brazing", 1971, pp. 124-125.*

Paul M. Bhadha, "How Weld Hose Materials Affect Shielding Gas Quality", AWS Welding Journal, pp. 35-40, Jul. 1999.

"Rubber and Elastomer Piping Systems", Engineering Manual, U.S. Army Corps of Engineers, EM 1110-1-4008, pp. 6-1 to 6-5, May 5, 1999.

"Elastomers", 11th Edition of the Material Handbook, pp. 168-274, Apr. 29, 2003.

E. Farish, "Atmospheric Contamination of TIG Welding Gas Hoses—Causes and Cures", Welding & Metal Fabrication, pp. 300-301, Jul. 1994.

"Industrial Hose Products", Brochure of Parker Industrial Hose Division, 2002 Parker Hannifin Corp., Publication No. PRB 4800-Welding, Jun. 2002.

"Tungsten Excerpt 052303", Specification for Tungsten and Tungsten Alloy Electrodes for Arc-Welding and Cutting, ANSI/AWS, A5. 12-92 (undated).

* cited by examiner

*Primary Examiner*—Clifford C. Shaw
(74) *Attorney, Agent, or Firm*—Bacon & Thomas, PLLC

(57) ABSTRACT

A welding process for non-stainless steel workpieces using GTAW equipment and hydrogen containing shield gas on a first root pass is improved by using a shield gas delivery system comprising hoses or conduits made of elastomeric material having a moisture permeability coefficient of less that 275, preferably less than 100, and using a tungsten electrode composition comprising at least tungsten and lanthanum oxide, and preferably tungsten, lanthanum oxide, yttrium oxide and zirconium oxide. Preventing moisture permeation through the elastomeric hoses delivering hydrogen containing shield gas eliminates expulsion of fused weld metal during second pass filler welding over the root pass weld. Electrode life is enhanced using the tungsten compounds.

16 Claims, 1 Drawing Sheet

PROCESS FOR WELDING

BACKGROUND

1. Field

This invention relates to a welding process, in particular a shielded gas tungsten arc welding (GTAW) process.

2. Related Art

An improved welding process for butt welding steel workpieces along bevel prepared joints using GTAW equipment with filler wire and hydrogen-argon (or other inert gas) shield gas mixtures during the first or root pass and then hydrogen-free inert gas during the subsequent filler passes is disclosed in U.S. Pat. No. 5,686,002 issued Nov. 11, 1997, this patent owned in common with the invention described and claimed herein.

In accordance with the process described in U.S. Pat. No. 5,686,002, medium to thick sheet or tubular steel metal workpieces are prepared by beveling their edges to be joined so they butt against each other with a small clearance ("open root"). A root weld pass is then made using conventional automatic (including semi-automatic) or non-automated GTAW equipment, filler wire and a shield gas composed preferably of a 95/5 argon-hydrogen mixture.

Successful welding of such workpieces, in particular workpieces made of carbon steel, was originally doubtful due to constraints against allowing hydrogen into carbon steel weldments because of embrittlement and porosity problems encountered in prior art welding procedures used with such metals when hydrogen contamination occurred.

On the other hand, it was theorized that the presence of hydrogen during the root pass would solve penetration, weld pool stability, cleanliness and other problems faced by welders joining carbon steel workpieces such as large diameter tubes and pipes that were prepared using beveled edges with open roots because of the enhanced heating effect obtained with hydrogen in the shield gas mixture.

The solution as described in U.S. Pat. No. 5,686,002 was to use the argon/hydrogen mixture only for the root pass and then use a hydrogen-free inert gas mixture for the subsequent passes, which theoretically would purge any free hydrogen from the weldment and produce a sound, non-porous weld that would not be subject to hydrogen embrittlement. Indeed, testing involving carbon steel as well as high strength steel such as chrome-molybdenum steel has shown that such welds that are free of adverse effects of hydrogen in the shield gas can be obtained using this novel procedure. Reference may be made to U.S. Pat. No. 5,686,002, which is incorporated herein in its entirety by reference, for a more detailed description of the welding process described therein.

While the welds produced using the method described in U.S. Pat. No. 5,686,002 are sound and of good quality, an unexpected phenomenon was observed when implementing the process to weld carbon steels that initially defied explanation.

Specifically, when the second weld pass was made over the root pass, sudden virtually explosive eruptions of fused metal in the weld pool area occurred with sufficient frequency and intensity so as to interrupt the welding process by contaminating the electrode and gas lens of the GTAW torch equipment. The eruptions were observed to actually deposit weld metal on the electrodes and gas lens to the extent that they required repair or replacement before welding could continue. This phenomenon was observed even during a second pass "dry wash" (fusion welding without filler) was being made.

An explanation was not readily at hand, as the root pass welds and the cover or filler welds were made strictly in accordance with all acceptable GTAW standards and specifications, including avoiding contamination of any kind in the weld zone during welding, in particular moisture and oxygen contamination. All the equipment of the GTAW apparatus was examined as was the shield gas supply. Electrodes were suspect initially, but that proved to be unproductive as a causation factor. Possible explosive chemical contamination was quickly ruled out, as was a possible combination of elements produced during welding that could result in the presence of a potentially explosive material or gas in the solidified weld metal of the root pass. Varying the mixture of the filler weld shield gas did not indicate that the shield gas as supplied was a source of the problem either. Moisture in the weld zone also was ruled out by experimentation involving preheating the workpieces.

It was eventually theorized that the expulsive events involving fused weld metal during the first filler or cover pass could be resulting from superheated gas of some kind possibly trapped in small pockets or cells in the solidified weld metal of the root pass that, as the leading edge of the pool approaches the pocket or cell and heats the area of metal surrounding the pocket or cell, is intensely pressurized until, when fusion of the surrounding metal occurs, the superheated and pressurized gas violently expands in an intense expulsion of fused weld metal. It was theorized that the use of hydrogen during the root pass could lead to some porosity initially that would be removed during the next cover or filler weld pass. Yet, the presence of small pockets of mostly argon and minor quantities of free hydrogen hardly would account for the violent nature of the eruptions that were observed during the first filler pass over the root weldment.

The mystery remained unsolved until further research pointed to the possibility that somehow trapped moisture could be contained in the cells or pockets of the root pass weld. How the errant moisture came to be lodged in the cells or pockets could not be envisioned upon initial investigation, as all precautions were taken to avoid moisture contamination in the shield gas and in the weld zone. If trapped moisture was contained in the cells, on the other hand, at least this could account for how the trapped vapor in the cells, being superheated into steam during the second pass, could cause the eruptions that were observed.

But how the moisture reached the weld area remained the question to be answered.

U.S. Pat. No. 2,905,805 issued in 1959 reviewed by the inventor during research concerning the weld metal expulsion problem revealed difficulties encountered with moisture pockets created during GTAW welding of stainless steel using an argon-hydrogen shield gas mixture comprising 35% hydrogen. In accordance with this patent, the chemical combination of hydrogen and oxygen during welding was believed to create moisture that lodged in pores of the weldment and the solution proposed in the patent was to limit the amount of hydrogen present at the weld zone in the shield gas and adjust the speed of weld tool advancement.

This theory did not seem plausible in the context of carbon, chrome-molybdenum, and other non-stainless steel welding with GTAW equipment and a 95/5 argon-hydrogen shield gas mixture. In the first place, no oxygen contamination in the weld zone was believed to be present due to the very nature of the shield gas system that maintained the weld zone oxygen-free at all time. There simply was insufficient oxygen to combine with the little hydrogen in the shield gas that was not consumed during welding to create moisture in the weld metal, irrespective of possible occurrence of cells or pockets in the weld metal due to other causes. Carbon steel welds were known to be subject to porosity to a considerably greater extent than stainless steel welds, but how moisture could be present in the cells of the pores of the carbon steel weld made in accordance with the process of U.S. Pat. No. 5,686,002 was not readily explainable.

Attention then focused on the shield gas delivery system as a possible source of moisture and possibly oxygen. It was theorized that perhaps the very substance that was intended to maintain the weld zone free of moisture and oxygen contamination, namely the shield gas, was itself transporting the harmful contamination despite all precautions.

The shield gas storage tanks, the fittings, the delivery hoses and the welding heads used for the supply and delivery of the shield gas mixture were all examined in detail for possible sources of contaminating moisture and oxygen. Still the source of such elements eluded discovery.

The elastomer shield gas delivery hoses then were examined as possible sources of hydrogen and oxygen contaminating the weld zone during the GTAW welding procedures carried out in accordance with U.S. Pat. No. 5,686,002. Although the hoses in use met all specifications for GTAW welding, it was learned that various plastic, rubber and other elastomer hose materials available for welding gas supply applications are subject to various degrees of gas permeation or diffusion through the wall of the hoses, depending on the material used to construct the hoses and other factors. Experimentation then resulted in the discovery that the likely source of the moisture in the cell pockets of the welds that were reacting in the manner described above was the elastomer shield gas delivery hoses that were permitting moisture vapor from atmosphere to permeate or diffuse through the hose walls to a sufficient degree to become entrapped in the cells or pockets of the root pass weld. Upon heating during the subsequent weld pass, the moisture was superheating and creating the violent expulsion effects observed. A solution to the weld metal expulsion events was needed to avoid the disadvantages that resulted from such expulsion.

As a secondary factor, the tungsten electrodes conventionally used in GTAW equipment were observed to degrade severely during use in the welding process according to U.S. Pat. No. 5,686,002, that is using 95/5 argon-hydrogen gas mixture. Unlike stainless steel welding procedures using 95/5 argon-hydrogen shield gas where electrode life was normal, or "clean room" environment welds involving high shielding environments, the process according to the said patent involved welding in environments not necessarily intended to produce "clean" or sterile welds. This typically is of little concern where stainless steel "clean room" welding is carried out, as such welding uses relatively low amperage and heat input and welds are of shorter duration than typical welding procedures involving, for example, carbon steel plates and heavy wall tubes, or other steels such as chrome-molybdenum. In a "clean room" processes, the doping agents in the tungsten electrodes used may not vaporize completely, thereby possibly reducing oxidation and condensation of oxides onto the electrode during use. On the other hand, tungsten electrodes used during a welding process according to the U.S. Pat. No. 5,686,002 patent with carbon, chrome-molybdenum and other non-stainless steels exhibited or will be expected to exhibit shorter life and to require replacing at frequent intervals, possibly due to longer welding times, higher heat input due to the hydrogen in the shield gas, oxide condensation on the electrodes, weld zone contamination at the location of the electrodes and other unidentified causes.

Clearly a solution to short tungsten electrode life in a welding process involving carbon steel-in particular, but any non-stainless steel generally using a partial hydrogen shield gas was needed.

BRIEF SUMMARY OF THE INVENTION

The invention is a process of buttwelding non-stainless steel metal workpieces having bevel joint preparations using GTAW welding apparatus and techniques according to U.S. Pat. No. 5,686,002 wherein the welding of the root pass is carried out using a shield gas elastomer hose delivery system that prevents permeation of moisture and preferably oxygen into the shield gas delivery hoses or delivery system as a whole of the welding apparatus.

Preferably, the elastomer shield gas delivery hose is selected that has a moisture diffusion or permeability coefficient (as defined in the description that follows) of 0 to 275, preferably less than 100. The permeability coefficient for oxygen for the elastomer delivery hose may be more tolerant, but preferably also lies in the same range as the preferred permeability coefficient for moisture.

Preferably, the invention includes using as a welding electrode for the GTAW process an electrode comprising by weight:

| | |
|---|---|
| Tungsten | 98.5% |
| $La_2O_3$ | 1.3 +/− 0.1% |
| $Y_2O$ | 0.1% |
| $ZrO_2$ | 0.1% |

Optionally, an electrode comprising 98.5% tungsten and 1.5% lanthanum oxide may be used.

The electrode compositions described above may be used without the use of the shield gas delivery hose material described above for enhanced electrode life when carrying out the basic process of welding in accordance with U.S. Pat. No. 5,686,002.

DETAILED DESCRIPTION OF THE INVENTION

With reference to the appended drawings:

FIG. 1 schematically illustrates a pair of non-stainless steel tubular workpieces to be buttwelded having beveled end joint preparations and an open root gap ready for carrying out a welding procedure in accordance with the prior art;

DETAILED DESCRIPTION OF PREFERRED EMBODIMENTS OF THE INVENTION

In accordance with a prior art process as described in U.S. Pat. No. 5,686,002, and with reference to the drawings, non-stainless steel (e.g., carbon steel) metal workpieces 10, 12 to be buttwelded together were prepared so that the ends of the workpieces to be welded were beveled so as to provide a total included bevel angle B, with each end section of the workpieces 10, 12 being beveled at an angle of B/2. The workpieces 10, 12 as illustrated were tubular metal sections, but the principle underlying the invention can be utilized with plate workpieces as well, in which case the butting sections of workpieces 10, 12 would be prepared so as to have an appropriate total bevel angle B between the workpieces.

Further in accordance with the process of U.S. Pat. No. 5,686,002, the end sections of the workpieces 10,12 were beveled so as to leave a land thickness L (FIG. 2) that was dimensioned to provide a uniform gap G between the root extremities of the workpieces and preferably of minimum thickness to ensure a good quality weld penetration between the workpieces using an appropriate heat input (amperage) from a GTAW welder for the weld configuration and workpiece metals involved in the weld procedure. Typically, a minimum land thickness was desirable to enable the first or root pass weld to be carried out between the workpieces in the root area of the joint using a minimum required amperage setting for GTAW equipment to minimize detrimental thermal effects on base metal alloys during the welding operation.

After the workpiece joints were prepared, the workpieces 10,12 were then brought into close proximity so as to leave an open root gap G (FIG. 2) that was configured so as to prevent undesirable thermal compression stresses of solidified weld metal upon completion of at least the root pass weld between the workpieces. Also, a gap G that was larger than the diameter of filler wire was to be avoided to prevent the filler passing through the open gap during welding. The dimension of the gap G was dependent upon considerations of the metallurgy of the base metal and the filler wire, the wall thickness of the workpiece and the shrinkage potential between the workpiece extremities during welding.

Figure 3:
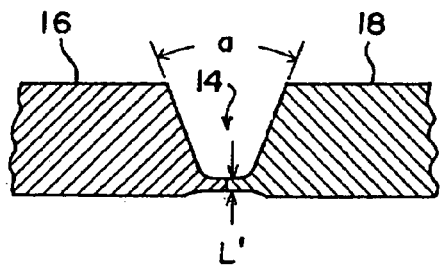
FIG. 3 shows a "J-type" joint preparation conventionally used for buttwelding with GTAW equipment.

The weld procedure in accordance with the U.S. Pat. No. 5,686,002 is described as using a conventional gas tungsten arc welding device or "GTAW" welder supplied with filler wire and a shield gas. In accordance with prior art procedures at the time, on the other hand, the use of such GTAW welder was not recommended for welding open root beveled joints and instead the recommended procedure was to use a "J" type end preparation as illustrated in FIG. 3 when GTAW welding equipment was to be used. When making the first weld or "root" pass between the workpieces at the root area of such "J" prepped end sections of the workpieces, it was believed that root weld passes with GTAW welding equipment should be made using a closed root or "jam up joint" preparation with a defined land thickness L' as illustrated in FIG. 3 between adjacent workpieces to ensure uniform good weld penetration and reinforcement.

Figure 1:
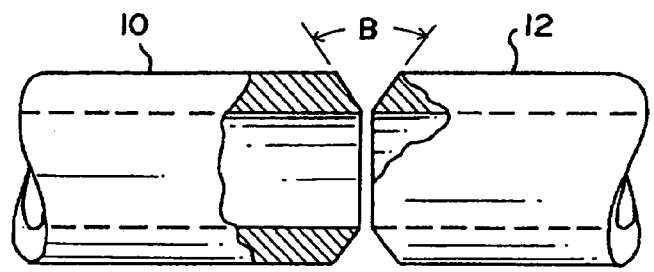
Figure 2:
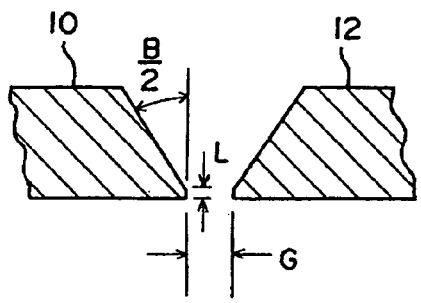
FIG. 2 is an enlarged view of the beveled joint area between the tubular workpieces illustrated in FIG. 1.

On the other hand, if a bevel joint such as shown in FIGS. 1 and 2 is closed up to eliminate the open root, stresses induced by weld metal shrinkage between the ends of the beveled workpieces caused poor quality welds in the root area particularly between carbon steel workpieces. As mentioned above, these problems could be overcome by using "J-preps" for the weld joint area as illustrated in FIG. 3 which provided a closed root joint 14 between workpieces 16, 18 having sloping surfaces with an included angle a between them, and a precise root end land thickness and configuration that satisfied the requirements of automated welders that were sensitive to any variations in the weld joint area.

It was conventional in certain segments of the metal conduit and fitting industry however to furnish conduit and fitting sections with pre-beveled end sections already prepared for welding with bevels cut at 37.5 degrees. It was not conventional to provide J-preps 14 as illustrated in FIG. 3 on the end sections 16, 18 of conduit and fittings. Such J-preps were usually done in the field prior to welding and the procedure was and still is both exacting and costly. Indeed, it is not unusual to re-prep straight beveled end sections to J-preps to enable automated welders to be used in a high volume production situation.

As described in U.S. Pat. No. 5,686,002, it was discovered that an open root bevel joint could be successfully welded using GTAW welders to which filler wire and a shield gas was supplied if the following procedure was utilized. The workpieces were prepared with straight bevel end joints cut to an angle of B/2 as shown in FIG. 2 so as to provide a total included angle B between the ends of the workpieces as illustrated in FIG. 1. The bevels were prepared such that the bevels had desired predetermined end lands L as illustrated in FIG. 2 and explained above. The objective was to make the end lands as uniform and small as possible to enable an automated welder to be properly programmed to make a root pass weld between the workpieces in the root area of the joint, while enabling the heat input (amperage setting of the welder) to be maintained at a level that would ensure good penetration of the base metal without detrimental metallurgical effect on the base and filler metal in the weld zone.

The workpieces were then brought together so as to provide an open gap G between the adjacent root extremities of the workpieces, with the value of G being selected so as to prevent stresses or strains between the workpiece ends due to heat shrinkage of the weld metal, which determined the minimum value of G, and to avoid the filler metal wire passing through the gap between the workpieces during automated welding, which determined the maximum value of the gap G.

Figure 4:
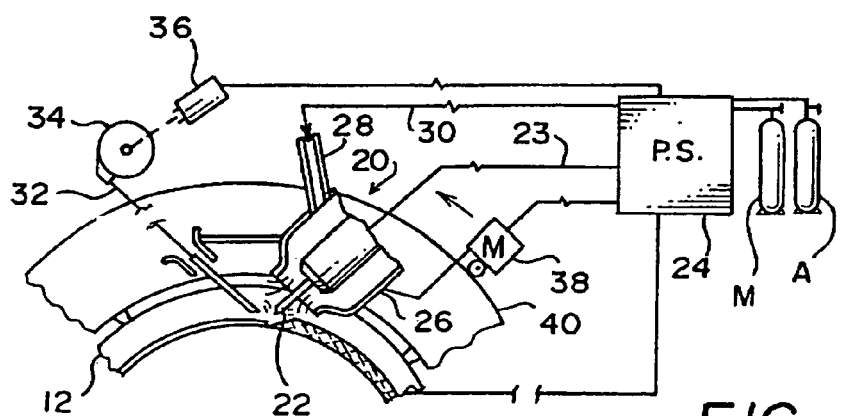
FIG. 4 schematically shows a welding procedure in accordance with the prior art being carried out using orbital GTAW equipment supplied with filler wire and both an argon-hydrogen shield gas mixture and argon gas alone.

After preparation of the joint area as shown in FIG. 2, the weld was carried out using GTAW welding equipment as illustrated in FIG. 4. In FIG. 4, an orbital GTAW welder 20 is schematically illustrated as carrying out a welding procedure in a beveled end joint area between workpieces 10 and 12 (workpiece 12 is only visible in FIG. 4). The GTAW welder 20 was conventional and included a non-consumable tungsten electrode 22 that was supplied with electrical power from a power supply 24 via line 23 to establish and maintain a welding arc between the workpieces 10,12 and the electrode. The power supply included various control systems that were operated in accordance with a computerized program for each welding pass between specific workpieces in accordance with conventional GTAW applications.

The GTAW welder 20 included a housing 26 that received shield gas through inlet conduit 28 via shield gas supply or delivery line 30 under the control of the power supply unit 24 in this example. The shield gas typically was argon that is inert and which was stored in an appropriate receptacle or "bottle" illustrated at A in FIG. 4. Other shield gases could be utilized in the welding procedure in accordance with known principles and the supply of other gases was controlled directly through the power supply 24 as illustrated in FIG. 4 or independently controlled by a device outside the power supply system.

In accordance with the process described in the U.S. Pat. No. 5,686,002, a commercial mixture of argon and hydrogen shield gas was supplied to the GTAW welder 20 via the power supply 24 from mixture supply container M and the power supply also controlled the supply of argon shield gas alone from supply source A.

Filler wire 32 was automatically supplied to the weld zone from a supply reel 34 under the control of the power supply 24 which regulated operation of a motor 36 that drove the supply reel 34 in accordance with the requirements of the welding program.

The GTAW welder 20 in the example thus far described was driven orbitally about the joint area to be welded by means of an appropriate rotary drive mechanism 38 under the control of the power supply 24 using a ring 40 as a guide track for the welder 20.

A critical element of the process was the use of hydrogen as a component of the shield gas when making the open gap root pass weld. During welding, the GTAW welder 20 was supplied with a hydrogen-containing shield gas mixture under the control of the power supply 24 for the open gap root pass between the workpieces 10,12 while filler wire 32 was supplied to the weld zone. The composition of the filler wire 32 corresponded metallurgically with the composition of the workpieces. Also in accordance with known principles and standards for GTAW welding, the shield gas supplied through inlet 28 and transported to the weld zone by the shield 26 should have provided a protective atmosphere in the weld zone to protect the molten weld metal from reacting with oxygen in air or other impurities or contaminants contained in surrounding atmosphere, including moisture.

Preferably, a blend of 95% argon-5% hydrogen gas ("95/5") was found to work effectively using an orbital GTAW welder on a 4" diameter medium thickness wall carbon steel pipe having a 37.5 degree bevel end preparation, a land thickness of from 0.000 to 0.010 in. (0.000 to 0.254 mm) and a 0.035 in. (0.889 mm) gap G between the ends of the pipe at the root area. While the 95/5 mixture was preferred, a mixture range between approximately 99% argon-1% hydrogen to 90% argon-10% hydrogen ("99/1 to 90/10") could be used effectively but probably with diminishing results in terms of weld penetration/reinforcement quality as the range of mixture departed from the preferred 95/5 mixture. It was believed a similar weld procedure would produce good quality root pass welds on medium to thick stainless steel pipes over 2 in. (0.5 mm) in diameter as well. The root pass was made without electrode oscillation with an appropriate current/voltage adjustment for a 95/5 gas mixture.

It was observed that the presence of hydrogen in the arc area tended to stabilize the weld pool and to center it within the open gap area to provide good penetration and filling in the root area of the weld as compared with a similar GTAW weld procedure without a hydrogen-containing shield gas.

After the root pass weld was completed, the GTAW welder was brought back to a starting position by motor 38 and at least one subsequent "filler" weld pass was promptly made using a hydrogen-free shield gas such as argon alone in accordance with known orbital GTAW welding procedures preferably while the root pass weld was still hot.

In accordance with known welding standards, the use of hydrogen-containing shield gas with carbon steel welding procedures was and still is usually avoided in conventional welding practice, at least in the United States, to avoid possible hydrogen entrapment in the weld joint that causes weakness in the weld due to a phenomenon called "hydrogen embrittlement." However, as noted previously, the use of hydrogen-containing shield gas, preferably a 95% argon-5% hydrogen mixture, was found to produce a good quality root pass welds on open gap bevel prepped workpieces due to the beneficial effects of the hydrogen in the weld zone. The solution to the hydrogen embrittlement problem, as described in U.S. Pat. No. 5,686,002 was to make subsequent weld passes over the root pass using argon alone to heat the root pass weld sufficiently to eliminate any residual hydrogen that may have remained in the weld.

While argon was preferred for the overlying or filler passes, it was only essential that the filler shield gas be hydrogen-free.

As described in the above background of the invention discussion, violent expulsion of fused weld metal during welding the second pass over the root pass was later found to be an impediment to the process according to U.S. Pat. No. 5,686,002. Despite all precautions taken to avoid contamination at the weld zone, the observed expulsion events could only be explained by the possible presence of moisture in cells or pockets formed in the weldment during the root pass.

In carrying out the described welding process, standard argon elastomer supply hoses such as Dayco 7121 Welding made by the Parker Hannifin Corp. were used. Research and experimentation indicated that such hose could be subject to diffusion of atmospheric moisture and oxygen that, due to partial pressure effects, could result in infusion of such gases into the hose despite a higher overall or total pressure inside the hose relative to atmospheric pressure. Further experimentation revealed that substantial improvement and virtual elimination of the expulsion effect described above could be attained by using elastomer shield gas supply hoses having permeability coefficients of 0 to 275, preferably under 100. The permeability coefficient of a material is a numerical value indicative of the permeability of the material to gases and its derivation is well known. Where P is permeability coefficient, it is defined in one source as:

$$P=\text{(amount of permeate)(film thickness)/(surface area)(time)(pressure-drop across film)}.$$

For a fuller description of permeability coefficient, reference may be made to the *AWS Welding Journal*, July, 1999, pgs. 37 and 38.

While the prior art recognizes that gas permeation can contaminate gases flowing through a supply conduit made of permeable materials even when the total pressure inside the conduit is higher than atmosphere, including welding gases, it was not recognized that the weld metal expulsion events that were observed when carrying out the second pass weld during a weld process according to U.S. Pat. No. 5,686,002 could be attributed to actual moisture permeation in hydrogen containing shield gas that becomes trapped in cells or pockets in a root pass of an open root weld joint between metal workpieces. In accordance with prior art data, contaminating permeation or diffusion was only relevant in the context of "clean room environment" welding requirements such as welding food service equipment and high purity conduits used for injectable medical material and microprocessor manufacturing applications and the like. Moisture contamination during an open root prepped root pass weld on steel such as carbon steel using a hydrogen containing shield gas was not a known concern during a second pass covering or filling weld, even in underwater welding applications generally where moisture contamination is a known concern.

Thus the present invention is a process of buttwelding non-stainless steel metal workpieces having bevel joint preparations using GTAW welding apparatus and techniques according to U.S. Pat. No. 5,686,002 wherein the welding of the root pass is carried out using a shield gas delivery system that prevents infusion of moisture and preferably oxygen into the shield gas elastomer delivery hose system of the welding apparatus.

Preferably, the elastomer shield gas delivery hose is selected that has a moisture permeability coefficient of 0 to 275, preferably less than 100. The permeability coefficient for oxygen for the elastomer delivery hose may be more tolerant, but preferably also lies in the same range as the preferred permeability coefficient for moisture.

Examples of shield gas delivery hose materials found to overcome the moisture based weld metal expulsion problem are High Extreme-Purity Teflon PFA 450 (perfluoroalkoxy) available from various manufacturers and distributors, and Thv Fluropolymer (tetrafluoroethylene hexafluoropropylene vinylidene) likewise available from various manufacturers and distributors.

Also, Nylon braid-reinforced PVC hose material available from various manufacturers and distributors was found to substantially reduce the weld metal expulsion events observed during the second pass weld step.

Generally, it is believed that shield gas hose or tubing made of copolymer elastomers comprising halogenated monomers exhibiting the above preferred permeability coefficients eliminate or substantially eliminate the weld metal expulsion events arising from moisture and possibly oxygen combining with the moisture that permeates shield gas delivery hoses having higher permeability coefficients. Typically, moisture permeates through elastomer materials to a much greater extent than oxygen.

Exemplary plastic materials known to have a permeation coefficient less than 100 include: Teflon (polytetrafluoroethylene), Teflone FEP (polytetrafluoroethylene-co), LDPE (low density polyethylene), HDPE (high density polyethylene), PP (polypropylene density 0.907 gm/cm$^3$), Saran (polyvinyledene chloride), and Kel-F81 (polytrifluoro chloroethylene).

Not all the above exemplary materials may be available presently for weld gas supply hose applications.

In accordance with another enhancement of the welding process according to U.S. Pat. No. 5,686,002, relatively short tungsten electrode life observed during the prior process described in the patent using 2% thoriated tungsten electrodes, which met all acceptable standards for typical GTAW applications, was overcome by using tungsten electrodes comprising (by weight):

| Tungsten | 98.5% |
|---|---|
| La$_2$O$_3$ | 1.3 +/− 0.1% |
| Y$_2$O$_3$ | 0.1% |
| ZrO$_2$ | 0.1% |

Such electrodes are conventionally known as "Tri-Mix" and are available from Wolfram Industrie of Traunstein, Germany and various distributors of welding products. Another tungsten electrode having improved life in the weld process according to U.S. Pat. No. 5,686,002 is made of a composition of 98.5% tungsten and 1.5% lanthanum oxide available under the general designation "1.5% lanthanated tungsten" from Stainless Stuff, Willows, Calif.

While exemplary embodiments of the processes constituting the inventive subject matter have been described herein, it must be understood that the embodiments are exemplary only and may be modified by those skilled in the art using routine variations known to the skilled mechanic, chemist or welder, involving alternative steps and materials that are equivalents or not substantially different from the described embodiments without departing from the scope of protection defined in the appended claims.

What is claimed is:

1. In a process of buttwelding non-stainless steel metal workpieces having bevel joint preparations using GTAW welder using filler wire including:
   preparing the beveled workpieces with bevel joint areas having minimal land thicknesses at their root extremities;
   placing the prepared workpiece joint sections together with an open gap defining an open root area between their adjacent root extremities, the gap having a minimum dimension that avoids harmful compression stress between the workpieces due to weld shrinkage and a maximum dimension that avoids filler wire penetration of the gap;
   fusion welding the open root area of the adjacent workpieces with a root pass weld using a GTAW welder supplied with filler wire and a shield gas including 1 to 10% hydrogen and the balance inert gas; and then
   overlaying the root pass weld with at least one additional filler weld pass using a GTAW welder supplied with filler wire and hydrogen-free shield gas, the improvement wherein
   said open root pass is carried out in the substantial absence of moisture in the area undergoing welding using a shield gas delivery elastomer hose having a moisture permeability coefficient of 0 to 275.

2. The improved buttwelding process according to claim 1, including using an elastomer delivery hose having a moisture permeability coefficient below 100.

3. The improved buttwelding process according to claim 2, including selecting as a delivery hose a hose made of copolymer elastomer made of halogenated monomers.

4. The improved buttwelding process according to claim 1, including using as a welding electrode a composition comprising, by weight:

| Tungsten | 98.5% |
|---|---|
| La2O3 | 1.3 +/− 0.1% |
| Y2O3 | 0.1% |
| ZrO2 | 0.1%. |

5. The improved buttwelding process according to claim 1, including using as a welding electrode a composition comprising 98.5% tungsten and 1.5% lanthanum oxide.

6. The process according to claim 1, wherein the metal workpieces comprise carbon steel.

7. The process according to claim 1, wherein the bevel joint area of each workpiece is beveled at 37.5.degree., the end land thickness of the joint ends are in the range of approximately 0.000 to 0.010 in. (0.000–0.254 mm), the gap dimension is about 0.035 in. (0.889 mm) and the workpieces are medium to thick wall thickness pipes.

8. The process according to claim 1, wherein the inert gas is argon.

9. The process according to claim 1, wherein the shield gas is 95% argon and 5% hydrogen.

10. The process according to claim 1, wherein the workpiece is tubular and wherein the root pass and overlaying welds are carried out using an orbital GTAW welder supplied with said filler wire and shield gas.

11. The process according to claim 1, wherein the second pass weld following the root pass is carried out using argon shield gas.

12. The process according to claim 1, wherein the metal workpieces are tubular conduits and fittings for such conduits.

13. The process according to claim 12, including using an orbital GTAW welder for the welding passes.

14. The process according to claim 1, including using an elastomer shield gas delivery hose substantially preventing infusion of oxygen into the shield gas via the delivery system.

15. In a process of buttwelding non-stainless steel workpieces having bevel joint preparations using a GTAW welder using filler wire including:

preparing the beveled workpieces with bevel joint areas having minimal land thicknesses at their root extremities;

placing the prepared workpiece joint sections together with an open gap between their adjacent root extremities, the gap having a minimum dimension that avoids harmful compression stress between the workpieces due to weld shrinkage and a maximum dimension that avoids filler wire penetration of the gap;

fusion welding the open root area of the adjacent workpieces with a root pass weld using a GTAW welder supplied with filler wire and a shield gas including 1 to 10% hydrogen and the balance inert gas; and then overlaying the root pass weld with at least one additional filler weld pass using a GTAW welder supplied with filler wire and hydrogen-free shield gas, the improvement comprising:

using as a welding electrode a composition comprising by weight:

| | |
|---|---|
| Tungsten | 98.5% |
| La2O3 | 1.3 +/− 0.1% |
| Y2O3 | 0.1% |
| ZrO2 | 0.1%. |

16. In a process of buttwelding non-stainless steel metal workpieces having bevel joint preparations using a GTAW welder using filler wire including:

preparing the beveled workpieces with bevel joint areas having minimal land thicknesses at their root extremities;

placing the prepared workpiece joint sections together with an open gap between their adjacent root extremities, the gap having a minimum dimension that avoids harmful compression stress between the workpieces due to weld shrinkage and a maximum dimension that avoids filler wire penetration of the gap;

fusion welding the open root area of the adjacent workpieces with a root pass weld using a GTAW welder supplied with filler wire and a shield gas including 1 to 10% hydrogen and the balance inert gas; and then overlaying the root pass weld with at least one additional filler weld pass using a GTAW welder supplied with filler wire and hydrogen-free shield gas, the improvement comprising:

using as a welding electrode a composition comprising 98.5% tungsten and 1.5% lanthanum oxide.

* * * * *